(12) United States Patent
Eom et al.

(10) Patent No.: US 8,779,976 B2
(45) Date of Patent: Jul. 15, 2014

(54) ANTENNA SYSTEM HAVING ADAPTIVE POLARIZATION CONTROL

(75) Inventors: Soon-Young Eom, Daejeon (KR); Young-Bae Jung, Daejeon (KR); Soon-Ik Jeon, Daejeon (KR); Jae-Ick Choi, Daejeon (KR); Yong-Sik Shin, Gyeonggi (KR)

(73) Assignees: Electronics and Telecommunications Research Institute, Daejeon (KR); SK Telecom Co., Ltd., Seoul (KR)

( * ) Notice: Subject to any disclaimer, the term of this patent is extended or adjusted under 35 U.S.C. 154(b) by 282 days.

(21) Appl. No.: 13/303,177

(22) Filed: Nov. 23, 2011

(65) Prior Publication Data

US 2012/0162008 A1 Jun. 28, 2012

(30) Foreign Application Priority Data

Dec. 28, 2010 (KR) .......................... 10-2010-0136468

(51) Int. Cl.
*H04B 7/10* (2006.01)

(52) U.S. Cl.
USPC .......................................... 342/361

(58) Field of Classification Search
USPC .......................................... 342/361
See application file for complete search history.

(56) References Cited

U.S. PATENT DOCUMENTS

| | | | | |
|---|---|---|---|---|
| 6,570,441 | B1* | 5/2003 | Sasaki ............................ | 329/306 |
| 2004/0198292 | A1* | 10/2004 | Smith et al. .................... | 455/272 |
| 2004/0242272 | A1* | 12/2004 | Aiken et al. ................ | 455/562.1 |
| 2008/0218424 | A1* | 9/2008 | Blanton ......................... | 343/756 |
| 2010/0020709 | A1* | 1/2010 | Ohm et al. ..................... | 370/252 |
| 2011/0109507 | A1* | 5/2011 | Warnick ........................ | 342/368 |

\* cited by examiner

*Primary Examiner* — Harry Liu
(74) *Attorney, Agent, or Firm* — Rabin & Berdo, P.C.

(57) ABSTRACT

An antenna system includes: an orthogonal multi-polarization antenna configured to output independent double orthogonal polarizations through two independent input/output terminals; an antenna main control unit configured to perform a polarization control algorithm, collect and analyze information for polarization control, and provide polarization control information; and a polarization control unit configured to perform independent amplitude and phase control with regard to a pair of independent channels connected to the orthogonal multi-polarization antenna, based on the polarization control information received from the antenna main control unit, so that various polarizations are formed.

9 Claims, 7 Drawing Sheets

ANTENNA SYSTEM HAVING ADAPTIVE POLARIZATION CONTROL

CROSS-REFERENCE TO RELATED APPLICATIONS

The present application claims priority of Korean Patent Application No. 10-2010-0136468, filed on Dec. 28, 2010, which is incorporated herein by reference in its entirety.

BACKGROUND OF THE INVENTION

1. Field of the Invention

Exemplary embodiments of the present invention relate to an antenna system for radio communication; and, more particularly, to an antenna system having adaptive polarization control so as to control polarization resources of a radio communication antenna on an environment/time basis.

2. Description of Related Art

In general, a radio communication system (e.g. radio terrestrial or satellite communication system) uses a predetermined frequency to transmit and receive data information wirelessly. The radio communication system has an antenna on its front-end as an important element for transmitting and receiving radio signals. Such an antenna needs to be constructed so as to transmit and receive radio waves efficiently. Therefore, there is a wide range of research and development in progress in connection with antennas.

Generally used high-frequency antennas include dipole antennas, monopole antennas, patch antennas, horn antennas, parabolic antennas, helical antennas, and slot antennas. Such antennas are used and applied variously with regard to the communication distance and service area.

Essential resources of a radio communication system include frequency, polarization, space, and direction. Recent increase in the type of radio communication services is followed by depletion of frequency resources, which are the most important resources of radio communication. In addition, the trend towards broadband services requires MIMO (Multiple Input Multiple Output) communication technology.

The MIMO communication technology employs multiple antennas and transmits data through multiple channels which are independent from each other, thereby increasing communication capacity. However, the majority of current radio communication terminals for MIMO communication or repeater/base station antennas use fixed polarization.

Such a fixed-polarization antenna system structure has a problem in that the service quality may be degraded by interference of services, for example, when services are expanded and provided through broadband in the future. Solving this problem requires an antenna system configured to variably control antenna polarization on a time basis in conformity with radio environments and system requirements.

SUMMARY OF THE INVENTION

An embodiment of the present invention is directed to an antenna system configured to adaptively control antenna polarization, specifically polarization signals, in a radio communication system through amplitude and phase control of the signals in conformity with various environment changes.

Other objects and advantages of the present invention can be understood by the following description, and become apparent with reference to the embodiments of the present invention. Also, it is obvious to those skilled in the art to which the present invention pertains that the objects and advantages of the present invention can be realized by the unit as claimed and combinations thereof.

In accordance with an embodiment of the present invention, an antenna system includes: an orthogonal multi-polarization antenna configured to output independent double orthogonal polarizations through two independent input/output terminals; an antenna main control unit configured to perform a polarization control algorithm, collect and analyze information for polarization control, and provide polarization control information; and a polarization control unit configured to perform independent amplitude and phase control with regard to a pair of independent channels connected to the orthogonal multi-polarization antenna, based on the polarization control information received from the antenna main control unit, so that various polarizations are formed.

The antenna main control unit may be configured to generate the polarization control information by collecting and analyzing radio communication traffic density, peripheral environment information, channel modeling information, and currently used polarization information.

The polarization control unit may have double channels so as to connect to the orthogonal multi-polarization antenna and independently control amplitude and phase of signals.

The polarization control unit may be implemented inside a baseband signal processing unit, and the baseband signal processing unit may be configured to perform control so as to generate antenna beam patterns and polarizations optimized for respective users through signal amplitude and phase control based on the polarization control information from the antenna main control unit.

The polarization control unit may be implemented inside a digital conversion and signal processing unit, and the digital conversion and signal processing unit may be configured to perform control so as to generate antenna beam patterns and polarizations optimized for respective sector group users based on the polarization control information from the antenna main control unit.

The polarization control unit may be implemented inside a front-end transmission/reception active unit, which is an analog part, and the front-end transmission/reception active unit may be configured to perform control so as to generate antenna beam patterns and polarizations optimized for respective sector group users based on the polarization control information from the antenna main control unit.

Amplitude and phase control for polarization control may be performed by a RF phase shifter and a RF power attenuator inside the front-end transmission/reception active unit.

The orthogonal multi-polarization antenna may include an orthogonal multi-polarization antenna device having two independent radiators orthogonal to each other so that, among respective input/output terminals of the radiators, two different pieces of independent data are combined and inputted to a first input terminal, and two different pieces of independent data are combined and inputted to a second input terminal.

DESCRIPTION OF SPECIFIC EMBODIMENTS

Figure 1:
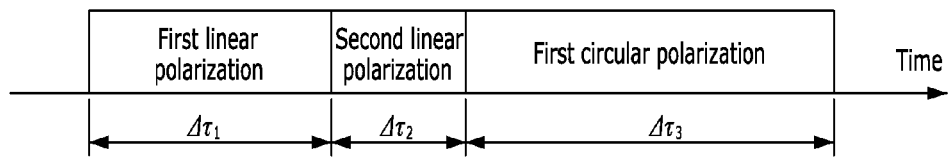
FIG. 1 illustrates a time-polarization relationship using different polarizations in a time domain in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An adaptive polarization control antenna system in accordance with the present invention, unlike conventional fixed polarization schemes, controls polarization on a time basis (on a real-time or long-term basis) in a radio communication antenna device or a device structure having the same role, as illustrated in FIG. 1, thereby improving radio communication quality or increasing communication capacity.

FIG. 1 illustrates a time-polarization relationship using different polarizations in a time domain in accordance with an embodiment of the present invention. Specifically, FIG. 1 indicates that polarization can be varied, based on real-time communication scheduling, to transmit/receive signals.

Referring to FIG. 1, the array antenna device can generate first linear polarization ($P_{LP1}$) for time $\Delta\tau_1$, second linear polarization ($P_{LP2}$) for time $\Delta\tau_2$, and first circular polarization ($P_{CP1}$) for time $\Delta\tau_3$.

Figure 2:
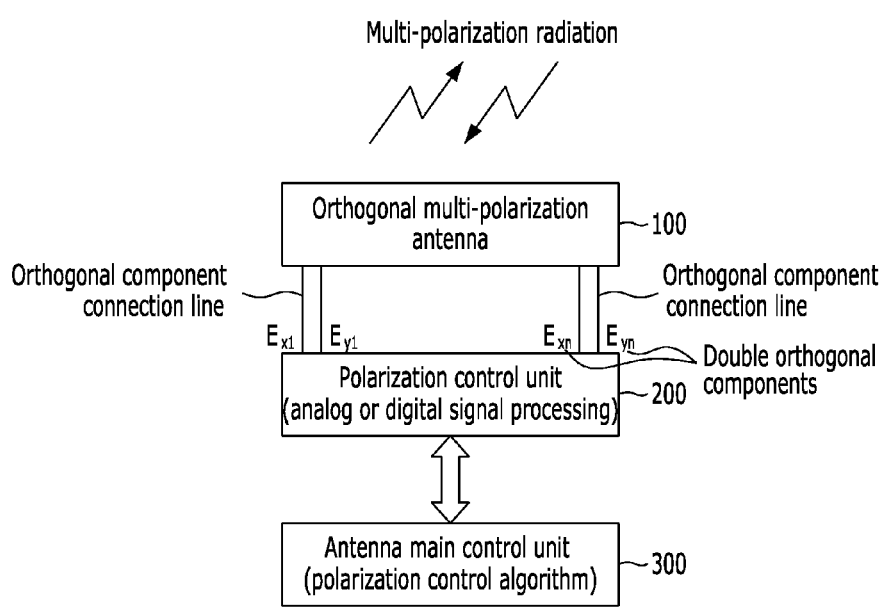
FIG. 2 illustrates the concept of a polarization control antenna system in accordance with an embodiment of the present invention.

FIG. 2 illustrates the construction of a polarization control antenna system in accordance with an embodiment of the present invention.

As illustrated in FIG. 2, the polarization control antenna system in accordance with the present invention includes an orthogonal multi-polarization antenna 100, a polarization control unit 200, and an antenna main control unit 300.

The orthogonal multi-polarization antenna 100 may have a unit antenna element structure, an array antenna structure having an optimally spaced arranged unit antenna elements, or a reflector plate antenna structure, as well as other various type of antenna structures.

Each of the employed antennas needs to have the following structural characteristics: the antennas have two independent input terminals and can generate two independent linear polarization or circular polarization signals from the radiation structure of the antennas. In other words, the orthogonal multi-polarization antenna element is constructed in the following manner: among respective input/output terminals of two independent radiators orthogonal to each other, two different pieces of independent data are combined and inputted to the first input terminal, and two different pieces of independent data are combined and inputted to the second input terminal.

Figure 3:
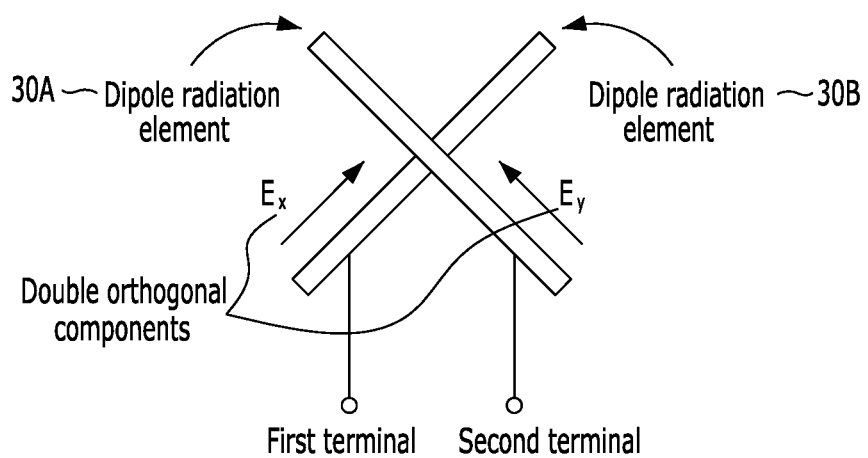
FIG. 3 illustrates the structure of an orthogonally intersecting dipole antenna element applied in accordance with an embodiment of the present invention.

FIG. 3 illustrates the structure of an orthogonally intersecting dipole antenna element, which is an antenna element that can be used as the orthogonal multi-polarization antenna 100 in accordance with an embodiment of the present invention.

Referring to FIG. 3, the orthogonally intersecting dipole antenna element has dipole radiators 30*a* and 30*b*, which intersect each other orthogonally and which are connected to two input terminals, respectively. Two orthogonal linear polarizations $E_{xn}$ and $E_{yn}$ are radiated through orthogonal component connection lines from the orthogonally intersecting dipole radiators. That is, the orthogonally intersecting dipole antenna element can form spatially diversified linear or circular polarizations through amplitude and phase control from the polarization control unit 200.

When both orthogonal components $E_{xn}$ and $E_{yn}$ have the same phase relationship or 180° phase difference (or integer times of 180°) relationship, vertical or horizontal linear polarization can be generated. When the amplitude size of both orthogonal components $E_{xn}$ and $E_{yn}$ is mutually adjusted under the two conditions, linear polarization can be generated in any direction.

When both orthogonal components $E_{xn}$ and $E_{yn}$ have the same amplitude relationship and 90° phase difference (or odd number times of 90°) relationship, left-handed or right-handed polarization is generated. When the amplitude of both orthogonal components $E_{xn}$ and $E_{yn}$ is adjusted differently under the two conditions, any elliptical polarization can be generated.

The polarization control unit 200 is configured to receive control information from the antenna main control unit 300 and, in order to form various desired polarizations on a real-time or long-term basis, control independently the amplitude and phase of a pair of independent channels connected to the orthogonal multi-polarization antenna 100.

Exemplary methods for controlling polarization from the polarization control unit 200 include a unit user-based polarization control method, in terms of base station array antennas, and a sector unit group polarization control method. That is, polarization control methods are classified based on the location of implementation of amplitude and phase control portions, which are core factors of the polarization control unit 200.

The antenna main control unit 300 is configured to perform a polarization control algorithm; collect and analyze mode-related information, such as current radio communication traffic density, peripheral environment information, channel modeling information, and currently used polarization information, on a real-time or long-term basis; generate control information for generating optimal antenna polarization based on unit users or sector group users; and provide the polarization control unit 200 with the control information for polarization control.

Figure 4:
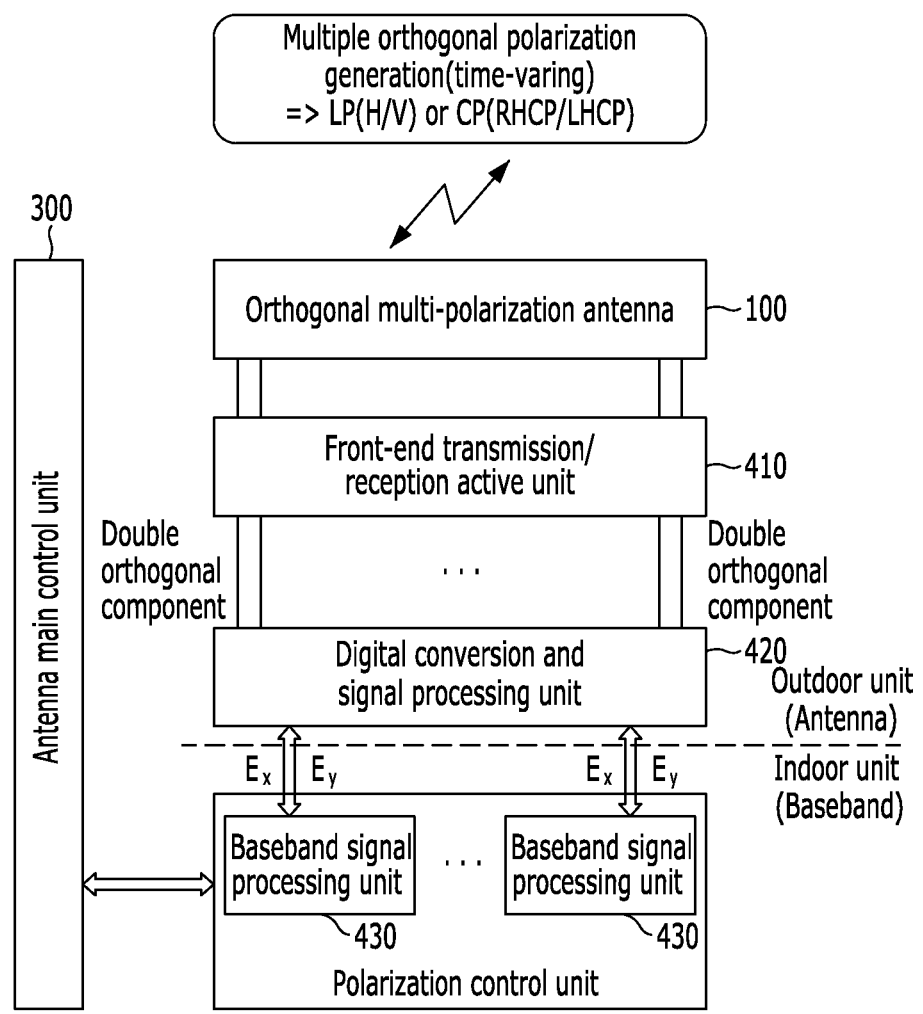
FIG. 4 illustrates the construction of an active smart antenna system of a unit user-based polarization control method in accordance with an embodiment of the present invention.
Figure 8:
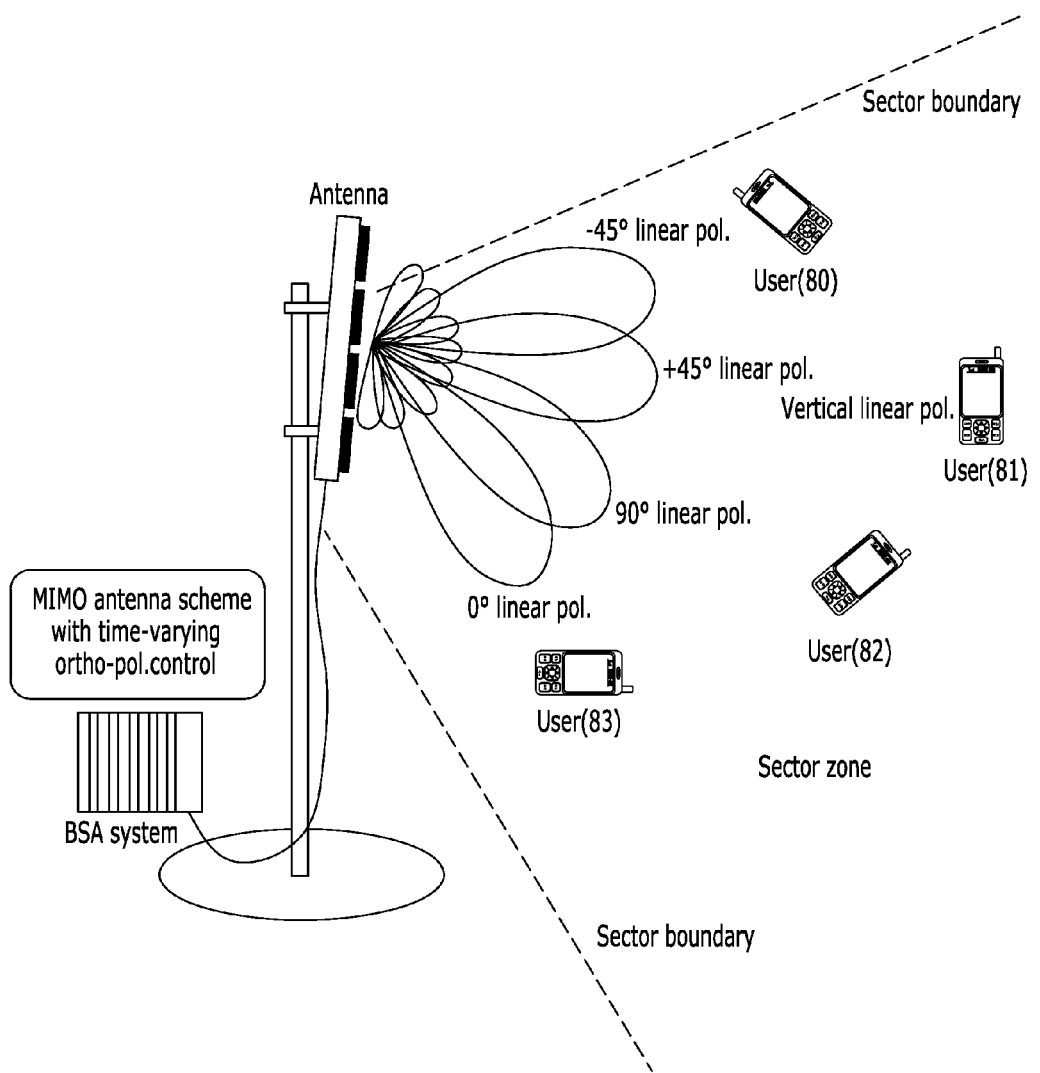
FIG. 8 illustrates the concept of operating a MIMO mobile communication network having sector unit group user-based polarization control in accordance with an embodiment of the present invention.

Reference will now be made to FIGS. 4 and 8 to describe in detail antenna systems having unit user-based polarization control and sector unit group polarization control, respectively, which are differentiated in terms of base station array antennas based on the location of implementation of amplitude and phase control portions of the polarization control unit 200.

FIG. 4 illustrates the construction of an antenna system having unit user-based polarization control in accordance with an embodiment of the present invention, specifically the construction of an active smart antenna system.

A unit user-based polarization control method provides each user of a radio communication service with independent adaptive beamforming and independent adaptive polarization functions simultaneously, thereby improving user service quality and increasing the communication capacity across the entire sector.

Referring to FIG. 4, respective double orthogonal components $E_{xn}$ and $E_{yn}$ outputted from respective antenna elements of an orthogonal multi-polarization antenna 100 are transferred to a digital conversion and signal processing unit 420 through a front-end transmission/reception active unit 410.

The digital conversion and signal processing unit 420 is configured to convert respective double orthogonal components $E_{xn}$ and $E_{yn}$, which have been received from the front-end transmission/reception active unit 410, into digital signals through analog-digital signal conversion and transfer the digital signals to corresponding baseband signal processing units 430 among a plurality of baseband signal processing units.

Respective baseband signal processing units 430 are configured to process digital signals received from the digital conversion and signal processing unit 420 and perform the function of a polarization control unit.

In other words, respective baseband signal processing units 430 perform digital signal processing, such as signal dividing, signal combining, and amplitude and phase control, based on control information for polarization control related to communication environments of respective users, which has been received from an antenna main control unit 300, so as to generate antenna beam patterns and polarizations optimized for communication environments given to respective users. The unit user-based independent polarization can be performed through amplitude and phase control of digital signals inputted at independent double orthogonal components, which are connected between the orthogonal multi-polarization antenna 100 and respective baseband signal processing units 430.

Figure 5:
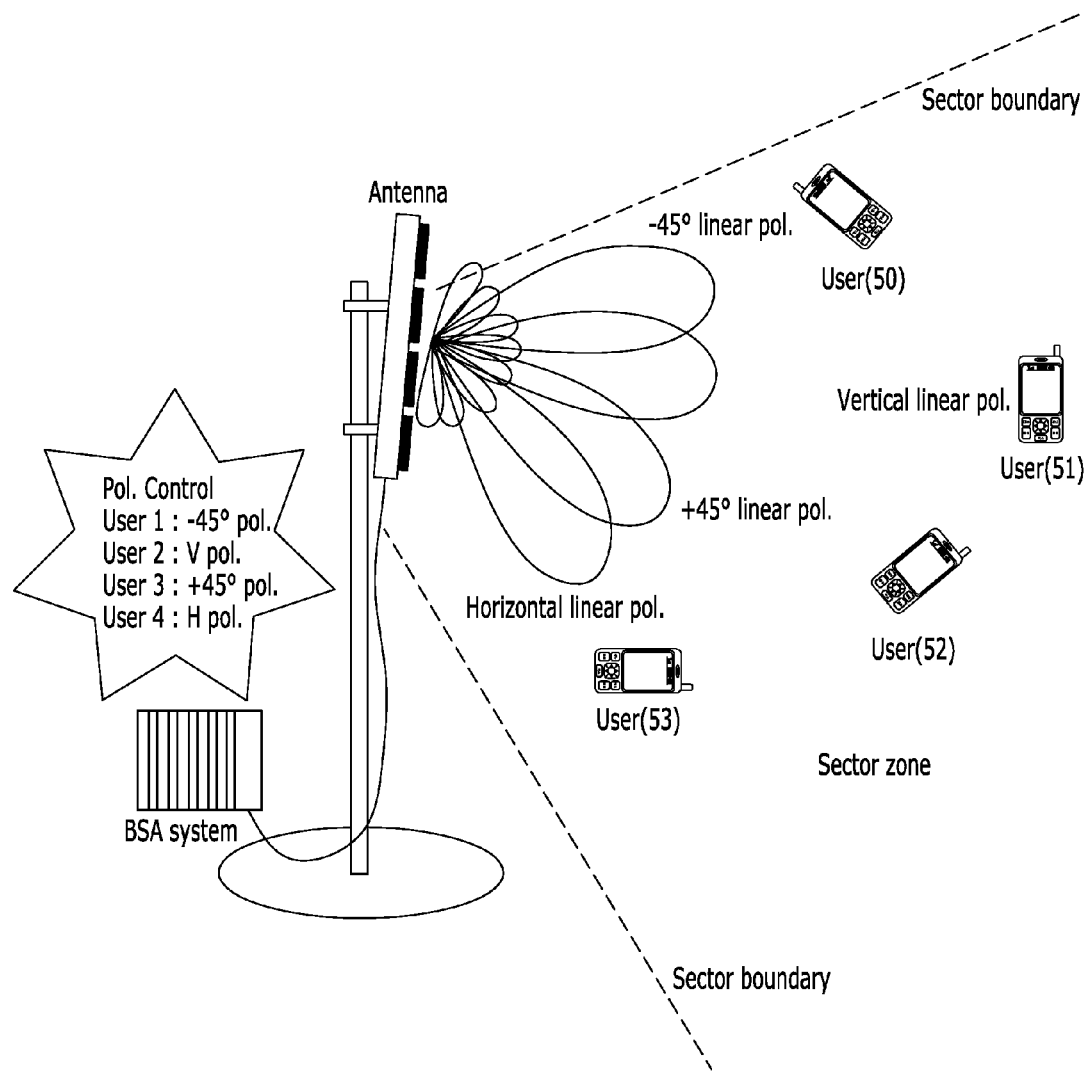
FIG. 5 illustrates the concept of operating a mobile communication network having unit user-based polarization control in accordance with an embodiment of the present invention.

FIG. 5 illustrates the concept of operating a mobile communication network which performs unit user-based polarization control using an antenna device having unit user-based polarization control of FIG. 4 in accordance with an embodiment of the present invention.

Referring to FIG. 5, the antenna is controlled in −45° linear polarization, vertical linear polarization, +45° linear polarization, and horizontal linear polarization modes, respectively, depending on environments of users 50 to 53 existing in the same sector zone. This means that, when the present invention is used, not only independent antenna beams, but also polarizations are controllable based on independent polarization control modes of unit users, thereby improving user service quality and finally increasing channel capacity.

Figure 6:
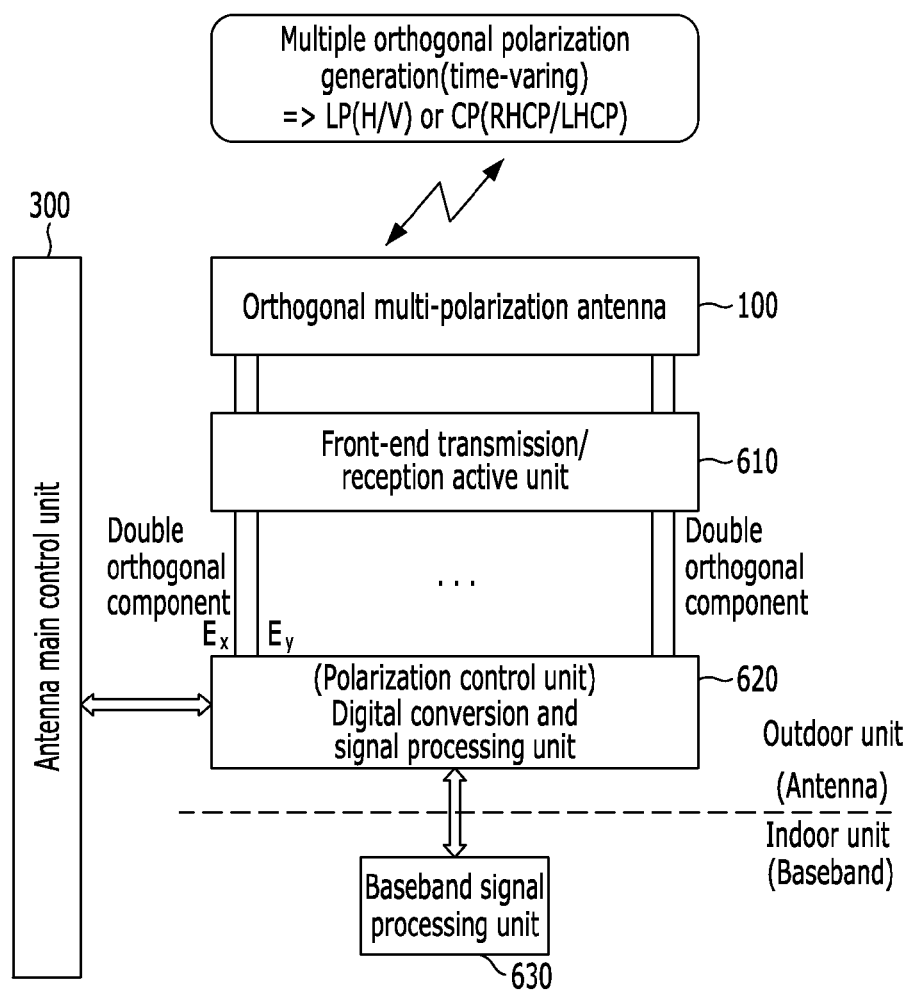
FIG. 6 illustrates the construction of a digital control-based active array antenna system having sector unit group user-based polarization control in accordance with an embodiment of the present invention.

FIG. 6 illustrates the construction of an antenna system having sector unit group user-based polarization control in accordance with an embodiment of the present invention, specifically the construction of a digital control-based active array antenna system.

A sector unit group-based polarization control method provides group users of a radio communication service within a sector with both flexible beamforming and adaptive polarization functions in conformity with radio communication density and environment changes, thereby improving group user service quality and increasing the communication capacity.

Referring to FIG. 6, respective double orthogonal components $E_{xn}$ and $E_{yn}$ outputted from respective antenna elements of an orthogonal multi-polarization antenna 100 are transferred to a digital conversion and signal processing unit 620 through a front-end transmission/reception active unit 610.

The digital conversion and signal processing unit 620 is configured to convert respective double orthogonal components $E_{xn}$ and $E_{yn}$, which have been received from the front-end transmission/reception active unit 610, into digital signals through analog-digital signal conversion and transfer a digital signals to the baseband signal processing unit 630. The baseband single processing unit 630 is configured to process the digital signals received from the digital conversion and signal processing unit 620.

The digital conversion and signal processing unit 620 is configured to perform the function of a polarization control unit for polarization control. Specifically, the digital conversion and signal processing unit 620 performs digital signal processing, such as signal dividing, signal combining, and amplitude and phase control, based on control information for polarization control related to communication environments of respective users, which has been received from an antenna main control unit 300, so as to generate antenna beam patterns and polarizations optimized for communication environments given to sector group users. In this case, polarization control for sector group users can be performed through amplitude and phase control of digital signals inputted at independent double orthogonal components, which are connected between the orthogonal multi-polarization antenna 100 and the digital conversion and signal processing unit 620.

Figure 7:
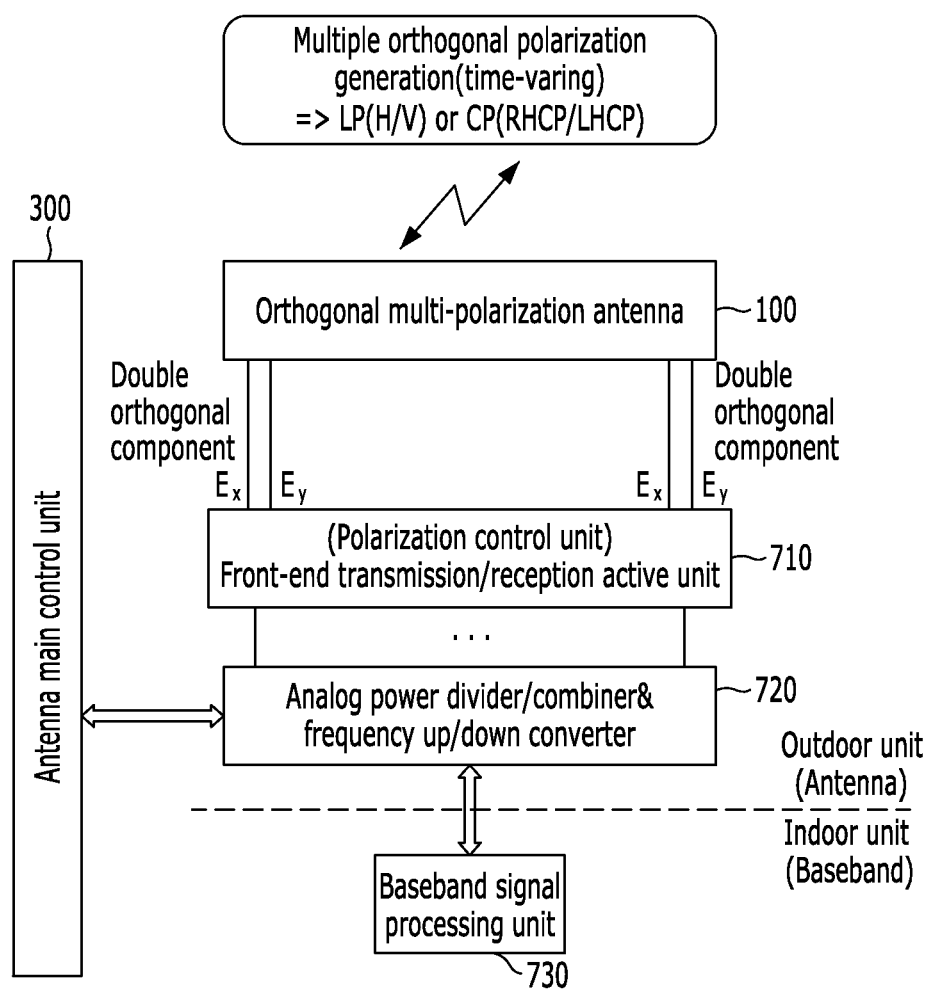
FIG. 7 illustrates the construction of an analog control-based active array antenna system having sector unit group user-based polarization control in accordance with an embodiment of the present invention.

FIG. 7 illustrates the construction of an antenna system proposed as another type of sector unit group user-based polarization control method in accordance with an embodiment of the present invention, specifically the structure of an analog control-based active array antenna system.

The antenna system illustrated in FIG. 7 is different from the digital control-based active array antenna system illustrated in FIG. 6 in that amplitude and phase control for generating various polarizations is performed by a RF (Radio Frequency) analog circuit portion. The analog control-based active array antenna of FIG. 7 and the digital control-based active array antenna of FIG. 6 have substantially the same polarization control characteristics and performances.

Referring to FIG. 7, respective double orthogonal components $E_{xn}$ and $E_{yn}$ outputted from respective antenna elements of an orthogonal multi-polarization antenna 100 are transferred to an analog power divider/combiner and frequency up/down converter 720 through a front-end transmission/reception active unit 710.

The analog power divider/combiner and frequency up/down converter 720 is configured to convert analog signals, which have been received from the front-end transmission/reception active unit 710, into baseband signals through frequency down conversion and transfer the signals to a baseband signal processing unit 730. The baseband signal processing unit 730 is configured to process the digital signals received from the analog power divider/combiner and frequency up/down converter 720.

The front-end transmission/reception active unit 710 can perform the function of a polarization control unit for polarization control. Specifically, the front-end transmission/reception active unit 710 performs analog signal processing, such as signal dividing, signal combining, and amplitude and phase control, based on control information for polarization control related to communication environments of respective users, which has been received from an antenna main control unit 300, so as to generate antenna beam patterns and polarizations optimized for communication environments given to sector group users. In this case, amplitude and phase control for polarization control is performed by a RF digital or analog phase shifter and a digital or analog RF attenuator.

FIG. 8 illustrates the concept of operating a MIMO mobile communication network having sector unit group user-based polarization control in accordance with an embodiment of the present invention, specifically an example of applying a MIMO antenna system, which has independent polarization control, to a radio communication network so as to provide both flexible beamforming and adaptive polarization functions in conformity with radio communication density and environment changes.

An antenna system having sector unit group user-based polarization control, as described with reference to FIGS. 6 and 7, can not only be used to perform polarization control for each sector unit group user, but also used for a mobile communication network, which employs MIMO antennas having such independent polarization control as illustrated in FIG. 8, to improve user service quality based on the unit user's independent polarization control mode, and finally increase channel capacity.

Referring to FIG. 8, various polarizations (−45° linear polarization, +45° linear polarization, 90° linear polarization, 0° linear polarization) are provided through amplitude and phase control for each of a plurality of users 80 to 83 existing in the sector zone.

The antenna polarization control technology proposed by the present invention uses a polarization modulator in terms of transmission, and a polarization demodulator in terms of reception, so that the technology is applicable to technologies for improving radio communication service quality and increasing communication capacity. Furthermore, the antenna polarization control technology in accordance with the present invention can be used to develop an algorithm for tracking and controlling antenna polarization, based on the antenna polarization control method, thereby improving radio communication service quality and increasing communication capacity.

In accordance with the exemplary embodiments of the present invention, there is provided an antenna system capable of polarization control while being adaptive to real-time or long-term radio communication environment changes in a radio communication system, thereby providing antenna polarization characteristics for each radio communication environment adaptation unit user or for each sector user group. This improves communication service quality and increases communication capacity. The present invention is capable of efficient and optimal radio wave operation and utilization adaptive to various services and complicated radio environments of the future, and is widely applicable to new next-generation mobile communication base stations or repeater array antenna devices, which combine and apply real-time polarization control technology and MIMO signal processing technology that are adaptive to radio communication environments for the next-generation high-speed data transmission.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. An antenna system comprising:
an orthogonal multi-polarization antenna configured to output independent double orthogonal polarizations through two independent input/output terminals connected to respective orthogonally intersecting antenna elements;
an antenna main control unit configured to perform a polarization control algorithm, collect and analyze information for polarization control, and provide polarization control information; and
a polarization control unit configured to perform independent amplitude and phase control with regard to a pair of independent channels connected to the orthogonal multi-polarization antenna, based on the polarization control information received from the antenna main control unit, so that various polarizations are formed.

2. The antenna system of claim 1, wherein the antenna main control unit is configured to generate the polarization control information by collecting and analyzing radio communication traffic density, peripheral environment information, channel modeling information, and currently used polarization information.

3. The antenna system of claim 1, wherein the polarization control unit has double channels so as to connect to the orthogonal multi-polarization antenna and independently control amplitude and phase of signals.

4. The antenna system of claim 1, wherein the polarization control unit is implemented inside a baseband signal processing unit, and the baseband signal processing unit is configured to perform control so as to generate antenna beam patterns and polarizations optimized for respective users through signal amplitude and phase control based on the polarization control information from the antenna main control unit.

5. The antenna system of claim 1, wherein the polarization control unit is implemented inside a digital conversion and signal processing unit, and the digital conversion and signal processing unit is configured to perform control so as to generate antenna beam patterns and polarizations optimized for respective sector group users based on the polarization control information from the antenna main control unit.

6. The antenna system of claim 1, wherein the polarization control unit is implemented inside a front-end transmission/reception active unit, which is an analog part, and the front-end transmission/reception active unit is configured to perform control so as to generate antenna beam patterns and polarizations optimized for respective sector group users based on the polarization control information from the antenna main control unit.

7. The antenna system of claim 6, wherein amplitude and phase control for polarization control is performed by a RF phase shifter and a RF power attenuator inside the front-end transmission/reception active unit.

8. The antenna system of claim 1, wherein the orthogonal multi-polarization antenna comprises an orthogonal multi-polarization antenna device having two independent radiators orthogonal to each other so that, among respective input/output terminals of the radiators, two different pieces of independent data are combined and inputted to a first input terminal, and two different pieces of independent data are combined and inputted to a second input terminal.

9. An antenna system comprising:
- an orthogonal multi-polarization antenna configured to output independent double orthogonal polarizations through two independent input/output terminals;
- an antenna main control unit configured to perform a polarization control algorithm, collect and analyze information for polarization control, and provide polarization control information; and
- a polarization control unit configured to perform independent amplitude and phase control with regard to a pair of independent channels connected to the orthogonal multi-polarization antenna, based on the polarization control information received from the antenna main control unit, so that various polarizations are formed;
- wherein the polarization control unit is implemented inside a baseband signal processing unit, and the baseband signal processing unit is configured to perform control so as to generate antenna beam patterns and polarizations optimized for respective users through signal amplitude and phase control based on the polarization control information from the antenna main control unit.

* * * * *